US012288090B1

United States Patent
Chhatwal et al.

(10) Patent No.: US 12,288,090 B1
(45) Date of Patent: Apr. 29, 2025

(54) CENTRAL DYNAMIC HELM CHART REPOSITORY FOR STANDARDIZED KUBERNETES RESOURCE MANAGEMENT

(71) Applicant: Morgan Stanley Services Group Inc., New York, NY (US)

(72) Inventors: Raminder Chhatwal, Monmouth Junction, NJ (US); Rupesh Joshi, Hasbrouck Heights, NJ (US); Samir Marfatia, Edison, NJ (US); Shashank Mishra, Edison, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/914,748

(22) Filed: Oct. 14, 2024

(51) Int. Cl.
G06F 9/455 (2018.01)
G06F 8/71 (2018.01)

(52) U.S. Cl.
CPC .......... G06F 9/45558 (2013.01); G06F 8/71 (2013.01); *G06F 2009/45595* (2013.01)

(58) Field of Classification Search
None
See application file for complete search history.

(56) References Cited

U.S. PATENT DOCUMENTS

| 11,321,064 | B1 | 5/2022 | Frey et al. | |
|---|---|---|---|---|
| 11,977,926 | B1* | 5/2024 | Punreddy | G06F 8/61 |
| 12,135,974 | B1* | 11/2024 | Lagun | G06F 8/61 |
| 2021/0011811 | A1 | 1/2021 | Balcha | |
| 2021/0064442 | A1 | 3/2021 | Alluboyina et al. | |
| 2022/0158926 | A1 | 5/2022 | Wennerstrom et al. | |
| 2022/0171649 | A1 | 6/2022 | Green et al. | |
| 2022/0291938 | A1 | 9/2022 | Goulding et al. | |
| 2022/0326929 | A1 | 10/2022 | Sharma et al. | |
| 2022/0350492 | A1 | 11/2022 | Beedu et al. | |
| 2023/0067168 | A1 | 3/2023 | Sharma et al. | |
| 2023/0082186 | A1 | 3/2023 | Balcha et al. | |
| 2023/0101551 | A1 | 3/2023 | Jobanputra et al. | |
| 2023/0118065 | A1 | 4/2023 | Kumar | |
| 2023/0142198 | A1 | 5/2023 | D'Innocenzo et al. | |
| 2023/0199628 | A1 | 6/2023 | Oliveira et al. | |

(Continued)

OTHER PUBLICATIONS

US 11,704,103 B1, 07/2023, Shah et al. (withdrawn)

*Primary Examiner* — Bradley A Teets
*Assistant Examiner* — Melissa A Headly
(74) *Attorney, Agent, or Firm* — Hunton Andrews Kurth LLP (57) ABSTRACT

Systems and methods for optimizing the management of resources in Kubernetes clusters are disclosed. An embodiment of the present invention is directed to central dynamic Helm charts, providing a flexible and efficient mechanism for deploying, managing, and updating applications within Kubernetes environments across an entity/platform. By centralizing Helm chart configurations and dynamically adjusting them based on real-time resource metadata, an embodiment of the present invention enhances scalability, reliability, and consistency in Kubernetes deployments. In addition, an embodiment of the present invention provides a Configuration Tool that automates creation of directory structures and YAML files required to perform industry standard deployment patterns with ease.

14 Claims, 8 Drawing Sheets

(56) References Cited

U.S. PATENT DOCUMENTS

| | | | |
|---|---|---|---|
| 2023/0239374 A1* | 7/2023 | Balachandran | G06F 16/972 709/223 |
| 2023/0368055 A1* | 11/2023 | Babu | G06N 7/01 |
| 2024/0248701 A1* | 7/2024 | Naga | G06F 8/65 |

* cited by examiner

```
Meta value is: XXXXX
Project value is: XXXXXXXXXX
Jira value is: XXXXXXXXXX
Channel value is: XXXXX
Instance value is: XXXXX
Branch value is:
Git Ops Push Branch value is: XXXXX
Git Ops Push value is: XXXXX
MS PC APP version value is: XXXXXXXXXX
Git Repo value is: XXXXXXXXXXXXXXXXXXXXXX
Base Folder value is: XXXXX
Jira Instance value is: XXXXXXXXXX Directory at path XXXXXXXXXX already exists.
Eon Id got for Meta: XXXXX Project: XXXXXXXXXXXXXXXXXXX
Cloning XXXXXXXXXXXXXXX project from XXXXX instance as user: XXXXX
Changing execution context to local workspace folder: XXXXXXXXXXXXXXXXXXXXXX
Doing a GIT checkout to new branch: XXXXX
Git Ops Push value after evaluation is: XXXXX
Setting up all the relevant files
Extracting Kube clusters info for all the environments using EON: XXXXX, CHANNEL: XXXXX
    Response statistics on API - XXXXX - XXXXX - Get Kube Clusters
        Server Host Name: None
        X-MS-UNIQUE-ID: XXXXX
        Retrieval Status: 200
Setting up files for cluster: XXXXXXXXXXXXXXX from current directory XXXXXXXXXXXXXXXXX
Writing kustomization contents at XXXXXXXXXXXXXXXXXXXXXXXXXXXXXXXXXXXXXXX
Writing helm release contents at XXXXXXXXXXXXXXXXXXXXXXXXXXXXXXXXXXXX
Writing config map contents at XXXXXXXXXXXXXXXXXXXXXXXXXXXXXXXXXXX
Setting up files for cluster: XXXXXXXXXXXXXXXXXXXXXXXXXXXXXXXXXXXXXXX
Writing kustomization contents at XXXXXXXXXXXXXXXXXXXXXXXXXXXXXXXXXXXXXXX
Writing helm release contents at XXXXXXXXXXXXXXXXXXXXXXXXXXXXXXXXXXXX
Writing config map contents at XXXXXXXXXXXXXXXXXXXXXXXXXXXXXXXXXXX
Updating XXXXXXXXX with Kube cluster info
Updating XXXXX with steps to build TAR file needed for gitops push
Committing the local changes to branch: gitops using JIRA: XXXXXXXXXXXXXXX
Pushing the local changes to branch: XXXXX
Registering XXXXXXXXXXXXXXXXXXXX project in artifactory
Setting up Train jobs for new branch: XXXXX
Finished Initializing GitOps file structure in XXXXXXXXXXXXXXXXXXXX project
Cleaning up local workspace folder: XXXXXXXXXXXXXXXXXXXXXX
```

```
kind: ConfigMap
apiVersion: v1
metadata:
  name: <CONFIGMAP NAME>
  namespace: <NAMESPACE>
  labels:
    kustomize.toolkit.xxxxcd.io/name: <HELM RELEASE NAME>
    kustomize.toolkit.xxxxcd.io/namespace: <NAMESPACE>
data:
  values.yaml: |
    serviceAccount: myserviceaccount
    ENV: dev
    F001: BAR1
    F002: BAR2
    F003: BAR3
    app_image: <IMAGE VERSION>
    feature1_flag: true / false
    feature2_flag: true / false
```

Figure 5

| Administrator ▽ | Project : | | | | | |
|---|---|---|---|---|---|---|
| Home ▷ | Init containers | | | | | |
| Operators ▷ | Name | Image | State | Restarts | Started | Finished | Exit code |
| Workloads ▽ | Side car 1 | | Terminated | 0 | 1 minute ago | 1 minute ago | 0 |
| Pods | | | | | | |
| Deployments | | | | | | |
| DeploymentConf | Containers | | | | | |
| StatefulSets | Name | Image | State | Restarts | Started | Finished | Exit code |
| Secrets | Side car 2 | | Running | 0 | 1 minute ago | - | - |
| ConfigMaps | Side car 3 | | Running | 0 | 1 minute ago | - | - |
| CronJobs | Volumes | | | | | |
| Jobs | Name | Mount path | SubPath | Type | Permissions | Utilized by |
| DaemonSets | Volume 1 | | No subpath | | Read-only | |
| ReplicaSets | | | | | | |

CENTRAL DYNAMIC HELM CHART REPOSITORY FOR STANDARDIZED KUBERNETES RESOURCE MANAGEMENT

FIELD OF THE INVENTION

The present invention relates generally to central dynamic Helm chart repository for standardized Kubernetes resource management.

BACKGROUND

Container orchestration generally refers to the practice of automating the deployment, scaling, and management of containerized applications. It emerged in response to the growing complexity of managing large-scale container deployments. Initially, containers revolutionized software development by enabling developers to package applications and their dependencies into portable units. However, as containerized environments scaled up, manual management became cumbersome and inefficient. Container orchestration platforms, such as Kubernetes, Docker Swarm, and Apache Mesos, provide automated solutions for tasks including scheduling containers, managing networking, and ensuring high availability. These platforms abstract away the underlying infrastructure complexities, allowing developers to focus on building and deploying applications efficiently and reliably.

The emergence of Kubernetes as the leading container orchestration platform has revolutionized the deployment and management of containerized applications. However, efficiently managing resources within Kubernetes clusters remains a challenge, particularly in dynamic and scalable environments. Existing solutions often rely on static configurations, leading to resource underutilization or over-provisioning.

Accordingly, there is a need for an improved system and method for optimizing the management of resources in Kubernetes clusters.

SUMMARY

Systems and methods for implementing a central dynamic Helm chart repository and a Configuration Tool that facilities and streamlines deploying, managing and updating applications in various Kubernetes environments across a platform are provided.

According to an embodiment, a computer-implemented system comprises: a computer server comprising one or more processors; a central repository storing central dynamic Helm charts; and non-transitory memory comprising instructions that, when executed by the one or more processors, cause the one or more processors to: trigger a CI/CD pipeline that pushes a manifest to an external repository; wherein the manifest comprises a Helm release manifest sourced from a config map stored in a configuration repository; perform continuous reconciliation with the external repository through a processing agent executing on a target Kubernetes cluster; pull, from the central repository, a central Helm chart referenced in the manifest wherein the central Helm chart comprises a configuration that includes a set of parameters that define one or more of: feature-flag, CPU limit, memory limit, replica, and deployment configuration; apply the manifest on the target Kubernetes cluster to complete a target flag based deployment; dynamically adjust the target flag based deployment based on one or more feature flags identified in a configuration file associated with the manifest; and dynamically apply features identified by the one or more feature flags in the target flag based deployment.

According to another embodiment, a computer-implemented method comprises the steps of: triggering a CI/CD pipeline that pushes a manifest to an external repository; wherein the manifest comprises a Helm release manifest sourced from a config map stored in a configuration repository; performing, via a processing agent, continuous reconciliation with the external repository wherein the processing agent executes on a target Kubernetes cluster; pulling, from a central repository, a central Helm chart referenced in the manifest wherein the central Helm chart comprises a configuration that includes a set of parameters that define one or more of: feature-flag, CPU limit, memory limit, replica, and deployment configuration; applying the manifest on the target Kubernetes cluster to complete a target flag based deployment; dynamically adjusting the target flag based deployment based on one or more feature flags identified in a configuration file associated with the manifest; and dynamically applying features identified by the one or more feature flags in the target flag based deployment.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

FIG. 4 is an exemplary user interface, according to an embodiment of the present invention.

DETAILED DESCRIPTION

Exemplary embodiments of the invention will be described in order to illustrate various features of the invention. The embodiments described herein are not intended to be limiting as to the scope of the invention, but rather are intended to provide examples of the components, use, and operation of the invention.

An embodiment of the present invention addresses technical challenges with current solutions through a central dynamic Helm chart repository and a configuration tool for target flag based deployment. Helm represents a package manager for Kubernetes that streamlines the deployment and management of applications using pre-configured packages known as charts. This simplifies the process of installing, upgrading, and managing Kubernetes applications. Helm charts provide a set of pre-configured Kubernetes resources in a single package. It has complex templates that generate Kubernetes resources dynamically on a cluster, a group of computing nodes that run containerized applications. The deployment template may have numerous infrastructure configurations defined to describe the target state of the application. These configurations may include, but are not limited to, service accounts, labels, volumes, mounts, side cars, etc. However, traditional Helm charts lack adaptability to changing infrastructure requirements.

Helm charts can be defined in many different ways depending on the individual developer, use case, application, environment, etc. In fact, each developer or team may define Helm charts in their own customized way, resulting in hundreds and hundreds of different variations of Helm charts. For example, as an entity migrates from a legacy platform to a modern platform such as Kubernetes, the entity may seek to deploy applications on the modern platform using Helm charts. With each developer or team defining Helm charts in their own way, the modernization would involve hundreds and hundreds of different variations of Helm charts being deployed on the modern platform of Kubernetes. Having many different customized variations creates issues for a production support team when an application is live in production. This also creates management and implementation difficulties, inefficiencies, and burdens.

Current challenges arising from the usage of individual custom Helm charts may include: inconsistent deployment templates; complex directory structures and manifest files; duplication of effort; difficulty in sharing deployment templates; increased risk of errors; and security risks.

It is common for each team to create deployment templates with different structures, formats, and naming conventions. This leads to difficulties in managing and deploying applications consistently across different projects and teams.

The Kubernetes deployment process follows industry standard methodology, such as GitOps that expects certain directory structure specifications, e.g., overlays, that eventually gets configured into the cluster agent (e.g., third party reconciliation tool) for polling-based deployment. These directory structures and the corresponding manifest files are complex to deal with and lead to manual errors if not done correctly.

Without a feature-based centralized repository for Helm Charts, teams may need to create deployment templates from scratch for each application or project. This leads to duplication of effort, as well as inconsistencies in the way that deployments are managed and configured.

Current solutions make it difficult to share deployment templates across different projects and teams. This significantly hinders the ability to collaborate effectively and further leads to inconsistencies in the way that deployments are managed and configured.

Without a dynamic centralized repository for Helm Charts, there is a greater risk of errors and inefficiencies in the deployment process. For example, teams may neglect to include necessary configuration files or may configure deployments incorrectly, thereby leading to errors, downtime, efficiencies and/or other inconsistencies.

With current solutions, it is difficult to manage access to deployment templates. This increases the risk of unauthorized access to deployment configurations and other sensitive information.

Accordingly, having a local custom repository for Helm Charts per team leads to inconsistencies in the deployment process, duplication of effort, and increased risk of errors and security risks.

An embodiment of the present invention is directed to central dynamic Helm charts that leverage a centralized repository that stores and manages chart configurations and dynamically adjusts them based on real-time key-value pairs available within the cluster ecosystem. The centralized repository, coupled with intelligent adjustment algorithms, automatically updates Helm releases to define the target state of the deployment. By dynamically adjusting parameters such as feature-flags for side cars, CPU, memory limits, replicas, and other configurations, an embodiment of the present invention ensures consistent deployment patterns across a platform.

According to an embodiment of the present invention, the intelligent adjustment algorithms may constitute a set of calculations performed based on a custom ruleset to update the Helm charts dynamically based on the key-value pairs and configurations in the centralized repository.

In addition to dynamic adjustments, central dynamic Helm charts facilitate version control, dependency management, and rollback mechanisms, thereby ensuring the reliability and stability of applications throughout their lifecycle.

Furthermore, an embodiment of the present invention is directed to Configuration Tool (a user-friendly utility) for developers, operators and other users to automatically form the directory structures and files (referencing the central dynamic Helm Chart), to be used for GitOps methodology, reconciling tool agents and other processing agents to simplify the deployment and management process.

The technical advantages of central dynamic Helm chart repository may include: standardization, reusability, Feature-Flag implementation, streamlined adoption, collaboration, automation and security.

The Centralized Helm Chart repository provides the ability to standardize the creation and management of deployment templates. By enforcing a consistent format and structure for Helm Charts, teams may reduce errors and improve deployment reliability.

The Centralized Helm Chart repository allows teams to create reusable deployment templates that may be used across multiple projects and teams. This saves significant time and effort in creating and managing deployments, as well as reduces the likelihood of errors.

With Feature-Flag implementation, side cars and features may be dynamically added and removed from the Helm charts based on the flags that are sourced from config map values hosted within a developer repository, such as appconfig repositories. Side cars may represent secondary containers that run along main application container within the same Pod.

Expected complex directory structures/overlays may be easily created by using the Configuration Tool (in-house utility) by supplying minimal inputs, thereby bringing in consistency in the deployment configuration and patterns.

The Centralized Helm Chart repository allows teams to collaborate more effectively by sharing deployment templates across multiple projects and teams. This further reduces duplication of effort and ensures consistency across projects.

The Centralized Helm Chart repository promotes automation using tools such as CI/CD pipelines, which further reduces the time and effort required to create and manage deployments. Continuous integration and continuous deployment (CI/CD) pipeline represents a series of steps that are performed in order to deliver a new version of software.

The Centralized Helm Chart repository improves security by allowing teams to centrally manage access to deployment templates. This ensures that only authorized users deploy applications and reduce the risk of unauthorized access.

Accordingly, a centralized feature-based dynamic Helm Chart repository provides significant advancements and technical advantages in Kubernetes resource management and deployment process. By creating reusable and standardized deployment templates, teams improve collaboration, reduce errors, and increase the efficiency and security of their deployment process.

Figure 1:
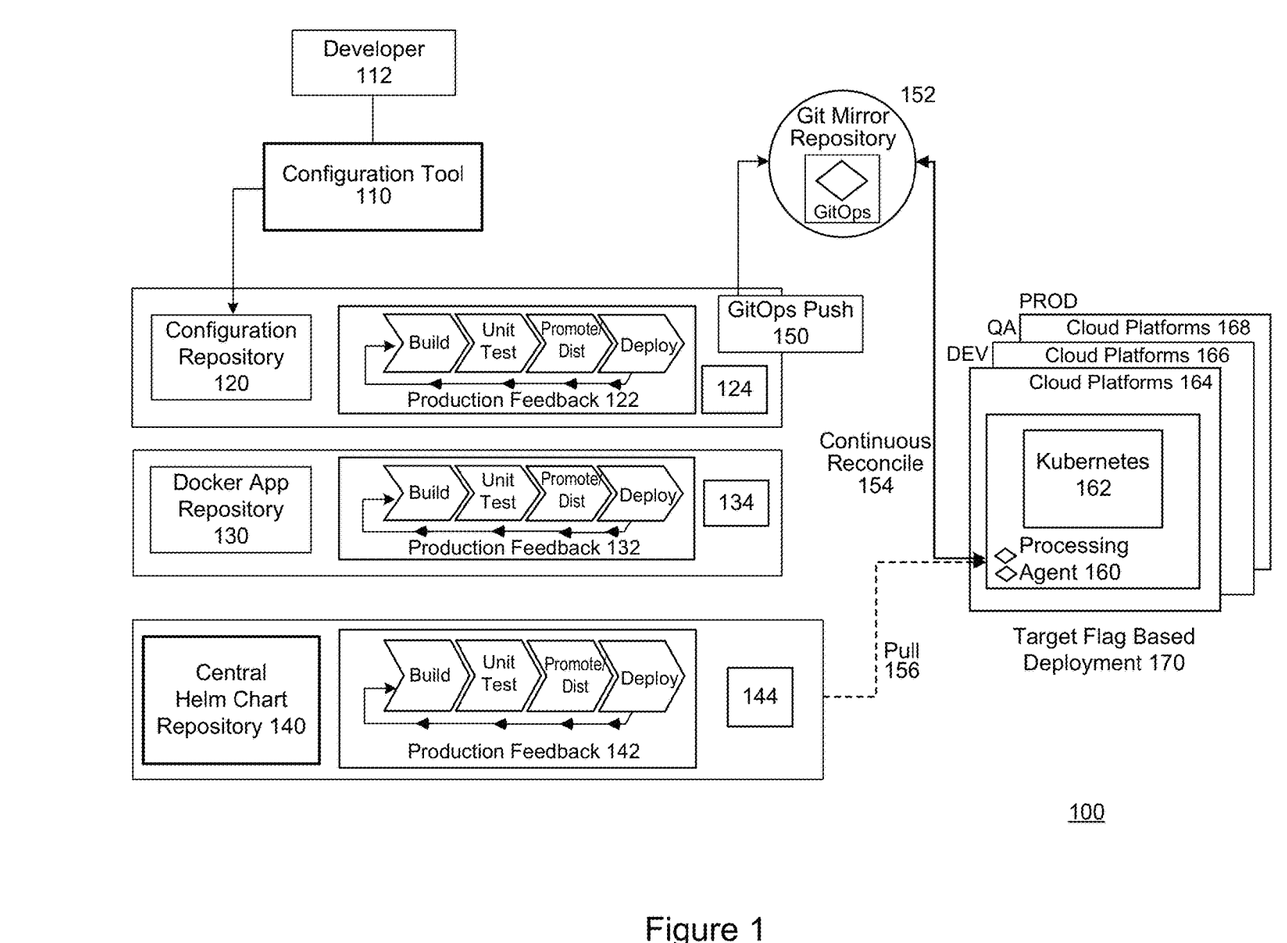
FIG. 1 is an exemplary overview diagram, according to an embodiment of the present invention.

FIG. 1 is an exemplary overview diagram, according to an embodiment of the present invention. FIG. 1 illustrates Configuration Repository 120 with CI/CD Pipeline 122 and Artifact Repository 124; Docker Application Repository 130 with CI/CD Pipeline 132 and Artifact Repository 134 and Central Helm Chart Repository 140 with CI/CD Pipeline 142 and Artifact Repository 144. Artifact Repository, shown by 124, 134, 144, may manage artifacts, binaries, dependencies, packages, files, containers and components to distribute and manage software in a secure manner.

Configuration Repository 120 may manage and store GitOps and application configuration files. Users, such as Developer 112, may interact with Configuration Tool 110 to create directory structures and configuration/manifest files. Configuration Tool 110 may also ensure that a central Helm Chart, from Central Helm Chart Repository 140, is referenced in he directory structures and files.

Docker Application Repository 130 may store and manage Docker applications, images, dependencies, business logic, source code and/or other data. Docker Application Repository 130 may be managed by a Development Team ("DevTeam"). A Docker application represents an application that is built, tested and deployed using Docker, a platform for developing, delivering and running applications in containers. Docker packages software into containers that include everything the software needs to run, including code, libraries, system tools and runtime. Docker images represent a set of instructions to create or build a Docker container. Build tools, such as TeamCity, Jenkins, etc., may be used to build Docker images, followed by image promotion to an image registry. Actual deployment of the docker image may happen via a GitOps based configuration repository that follows industry practices for automated reconciliation.

Central Helm Chart Repository 140 may centrally manage and store dynamic Helm Charts, configurations and associated data. Central Helm Chart Repository 140 may support automatic updating of Helm releases to define a target state of deployment. Central Helm Chart Repository 140 may include Helm Chart versions, dependencies, roll back, etc.

An embodiment of the present invention is directed to implementing central dynamic Helm charts and providing a flexible and efficient mechanism for deploying, managing, and updating applications within Kubernetes environments across an entity/platform. By centralizing Helm chart configurations and dynamically adjusting them based on real-time resource metadata, an embodiment of the present invention enhances scalability, reliability, and consistency in Kubernetes deployments.

Central Helm Chart Repository 140 provides a standard reuseable template that ensures consistency across an entire platform. This enables production support teams, development teams and other teams and users to access information that is current and consistent for all users, use cases, applications across a platform, an entity, an ecosystem, etc. Various users and teams may access and determine various features including where logs are going, how monitoring is defined, how tracing is performed, etc. From an infrastructure perspective, information is standard which simplifies support and encourages re-useability.

According to an embodiment of the present invention, Helm charts are centrally stored and managed in Central Helm Chart Repository 140 and pulled at the time of deployment, as shown by 156. As noted above, a central Helm Chart may be referenced and validated through the Configuration Tool 110.

An embodiment of the present invention is directed to dynamic feature flags. Helm Charts may be dynamically adjusted based on real-time key value pairs. For example, configuration parameters may be dynamically adjusted through feature flags. A set of parameters may be passed to a central Helm chart that then generates a deployment using the set of parameters to be run within a specific namespace of a Kubernetes cluster within an ecosystem.

An embodiment of the present invention enables a developer (or other user), as shown by 112, to opt-in or opt-out of certain features through dynamic feature flags. The central Helm Chart may include a set of features that may be activated or de-activated at deployment. For example, a central Helm Chart may include five features, e.g., Feature A, Feature B, Feature C, Feature D and Feature E. Project 1 may need Features A, B and C while Project 2 needs Features B, C, D and E. The central Helm Chart may use feature flags to turn features on and off at deployment. In this example, Project 1 may include flags that are activated for Features A, B and C while Project 2 has flags activated for Features B, C, D and E. With the dynamic feature flag, the central Helm Chart may cater to various use cases and further adjust and grow as more features are added, adjusted and/or removed. This eliminates the need to generate custom Helm Charts for each individual application, use case, etc. and further supports efficiency, consistency and a streamlined deployment.

An embodiment of the present invention supports enforcements and requirements through the Central Helm Chart Repository 140. For example, an entity may seek to enforce a requirement that needs to be addressed immediately and across a team, an entire platform or other defined subset. The centrally managed Helm Charts may enforce requirements promptly as opposed to updating hundreds and hundreds of custom Helm charts individually for an entire platform and organization. An embodiment of the present invention supports prompt enforcements, deployments and further facilities auditing.

During the deployment pipeline, an embodiment of the present invention may apply validation rules to ensure that central Helm Charts stored in Central Helm Chart Repository 140 are being invoked properly. Validation rules may be applied to prevent the ability to use a custom Helm chart or even an outdated Helm chart in the system 100 illustrated in FIG. 1. An embodiment of the present invention ensures that the correct version of the central Helm Chart is being used with the system, as central Helm Charts may continue to evolve and change as needed. For example, validation rules may be applied prior to GitOps Push 150 as shown in FIG. 1.

An embodiment of the present invention is directed to Configuration Tool 110 that automates creation of complex directory structures and deployment manifest files (e.g., YAML (Yet Another Markup Language) files) required to perform industry standard deployment patterns with ease. In addition, Configuration Tool 110 may support central Helm chart references with Feature Flags defined in Config Maps in Configuration Repository 120. Developers may interact with Configuration Tool 110 through a user interface or other input. As shown in FIG. 1, a CI/CD pipeline with Target Flag Based Deployment 170 may be trigged through System 100.

A config map represents an API object used to store non-confidential data in key-value pairs. Pods can consume config maps as environment variables, command-line arguments or as a configuration file in a volume. Configuration files may be stored in Config Maps. Configuration Files should be stored in version control before being pushed to the cluster.

Manifest Files may represent YAML or JSON files that describe the desired state of a Kubernetes object. A Manifest File can be used to create a Config Map and store variables. When a Helm chart is installed, it creates a release. A release contains objects, such as ConfigMaps. A release is an instance of a Helm chart running on a cluster. Each time a Helm chart is installed, it creates a new release or instance.

Configuration Tool 110 may receive minimal inputs from Developer 112 to generate configuration files. The minimal inputs may include: a project name, JIRA (or other issue tracking system) ticket and Kubernetes platform (on-premise/cloud). The inputs may identify where the developer wants to define the inputs and directory structure. Configuration Tool 110 may then generate configuration files and directory structures with a reference to a Central Helm Chart stored in Central Helm Chart Repository 140. The directory structures may be consistent with the structure/format expected and required by Git Mirror Repository 152. Developer 112 may then verify the generated directory structures. The configuration files may be stored and managed in Configuration Repository 120. Git Mirror Repository is one example, other external repositories may be implemented.

The Configuration Tool may generate a collection of files and directories including: a GitOps branch in _appconfig repository with a GitOps folder; sub-folders for each of the Kubernetes cluster needed; a base/appname/<mks>folder; under each Kubernetes cluster name folder a sub-folder name appid/appname; adding the needed GitOps files in the appid/appname; a GitOps.yaml file created at the root of appconfig project that specifies the cluster that will be targeted for deployment per environment; the property files from app folders moved to gitops/base/<app name>/mks; and AppConfig project artifacts are distributed to Artifact Repository.

Git Mirror Repository 152 may receive code through GitOps Push 150 for deployment on a Kubernetes cluster within a platform. Processing Agent 160 runs on every Kubernetes cluster. As shown by 154, Processing Agent 160 performs continuous reconciliation and accesses central Helm Chart through Pull 156, for deployment on a Kubernetes endpoint, shown by 162, and platform illustrated by Cloud Platforms 164, 166, 168. Processing Agent 160 may continuously check Git Mirror Repository 152 for new configurations and changes which may then be applied to Kubernetes cluster, shown by 162. Cloud Platforms 164, 166, 168 may support Development, Quality Assurance and Production, respectively. Other deployment endpoints and configurations may be supported.

GitOps is an approach that allows entities to manage infrastructure and applications by leveraging a source of truth when using Kubernetes as a container orchestrator for deployment. In GitOps, Git is used as the single source of truth for all configurations where all changes are made through Git. GitOps uses declarative configurations such as manifests, Kustomize configs, Helm charts and others to manage infrastructure and applications. GitOps relies on a set of configuration files that define the system's desired state and any approved changes are automatically reconciled. Using source code management through a single source of truth, GitOps implements and deploys source manifests.

GitOps requires a certain directory structure that contains information needed for deployment on Kubernetes clusters, platforms. The directory structure may involve: GitOps Folder, Cluster Folder, NameSpace Folder with inputs, parameters, config maps, key-value pairs, reference to central Helm Chart, etc. Other directory structures may be supported.

With the architecture illustrated in FIG. 1, changes and updates in code and dependencies may be addressed through config maps via Configuration Tool 110 rather updating actual source code.

The system components are exemplary and illustrative, System 100 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

System 100 of FIG. 1 may be implemented in a variety of ways. Architecture within System 100 may be implemented as hardware components (e.g., module) within one or more network elements. It should also be appreciated that architecture within System 100 may be implemented in computer executable software (e.g., on a tangible, non-transitory computer-readable medium) located within one or more network elements. Module functionality of architecture within System 100 may be located on a single device or distributed across a plurality of devices including one or more centralized servers and one or more mobile units or end user devices. The architecture depicted in System 100 is meant to be exemplary and non-limiting. For example, while connections and relationships between the elements of System 100 is depicted, it should be appreciated that other connections and relationships are possible. System 100 described below may be used to implement the various methods herein, by way of example. Various elements of System 100 may be referenced in explaining the exemplary methods described herein.

Connections illustrated in FIG. 1 may represent networks including wireless network, a wired network or any combination of wireless network and wired network. Networks may further include one, or any number of the exemplary types of networks operating as a stand-alone network or in cooperation with each other. Networks may utilize one or more protocols of one or more network elements to which it is communicatively coupled. Networks may translate to or from other protocols to one or more protocols of network devices. Although the connections in FIG. 1 may be depicted as one network for simplicity, it should be appreciated that according to one or more embodiments, Networks may comprise a plurality of interconnected networks, such as, for example, a service provider network, the Internet, a cellular network, corporate networks, or even home networks, or any of the types of networks mentioned above.

Data may be transmitted and received via Networks utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While FIG. 1 illustrates individual devices or components, it should be appreciated that there may be several of such devices to carry out the various exemplary embodiments. System 100 may communicate using any mobile or computing device, such as a laptop computer, a personal digital assistant, a smartphone, a smartwatch, smart glasses, other wearables or other computing devices capable of sending or receiving network signals.

System 100 may be communicatively coupled to various local and remote storage components. These storage components may include any suitable data structure to maintain the information and allow access and retrieval of the information. The storage may be local, remote, or a combination. The storage components may have back-up capability built-in. Communications with the storage components may be over a network or communications may involve a direct connection between the various storage components, as depicted in FIG. 1. The storage components may also represent cloud or other network based storage.

Figure 2:
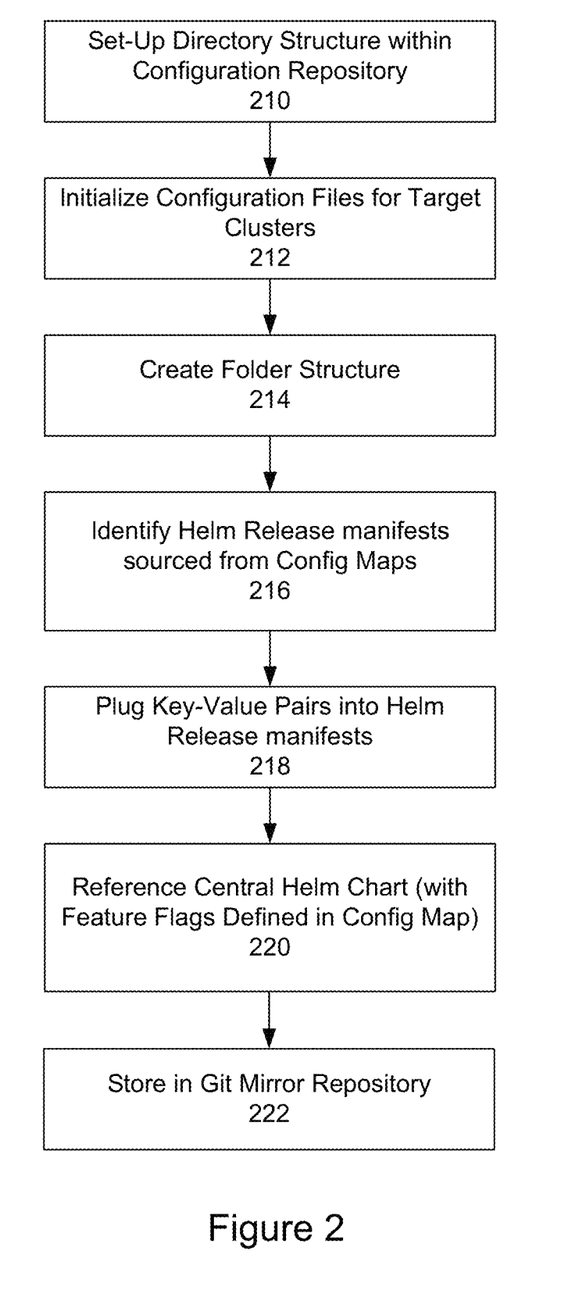
FIG. 2 is an exemplary flowchart, according to an embodiment of the present invention.

FIG. 2 is an exemplary flowchart, according to an embodiment of the present invention. At step 210, a directory structure may be set-up within a Configuration Repository. At step 212, configuration files may be initialized for target clusters. At step 214, a folder structure may be created. At step 216, Helm release manifests sourced from config maps may be identified. At step 218, key-value pairs may be plugged into Helm release manifests. At step 220, Central Helm Charts may be referenced. At step 222, config map and Helm Chart release version may be stored in an external repository, such as Git Mirror Repository. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 210, a directory structure may be set-up within a Configuration Repository. The Configuration Tool may set-up a GitOps directory structure within an appconfig repository, such as Configuration Repository 120, as an onboarding/enablement step.

At step 212, configuration files may be initialized for target clusters. The Configuration Tool may initialize the configuration files for the clusters associated with a specific project. At step 214, a corresponding folder structure may be created.

FIG. 4 is an exemplary user interface, according to an embodiment of the present invention. FIG. 4 shows the creation of a folder structure as shown by 410 where corresponding files may then be created. In this example, Section 410 illustrates writing Kustomization contents; writing Helm release contents and writing config map contents. This then creates a Kustomization file; a Helm Release File and a Config Map File, respectively.

At step 216, Helm release manifests sourced from config maps may be identified. For every cluster and namespace combination, there will be a set of Helm Release manifests that are sourced from config maps for various inputs. Inputs may include key-value pairs.

Figure 5:
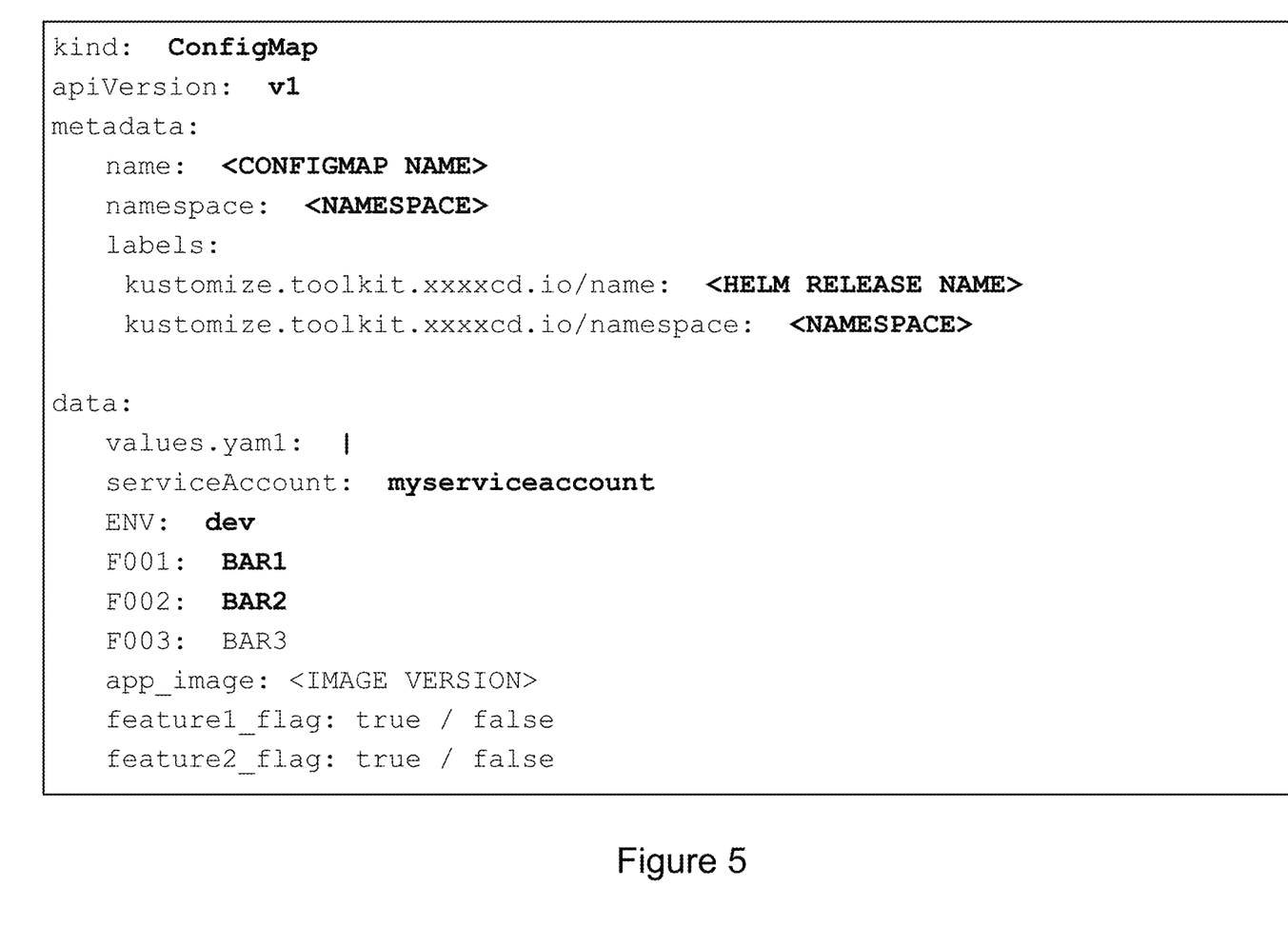
FIG. 5 is an exemplary user interface, according to an embodiment of the present invention.

FIG. 5 is an exemplary user interface, according to an embodiment of the present invention. FIG. 5 illustrates a config map for a Helm Chart. Config map may have a set of components including: kind; apiVersion; metadata and data. Metadata may include: name, namespace, and labels. Data may include: YAML values; service account, environment, app image, feature flags and other fields. Config maps may be specific to each environment. For example, a separate config map may be specific to Development, QA, Production, etc.

At step 218, key-value pairs may be plugged into Helm Release manifests. For example, key-value pairs along with image tags to be deployed may be applied to the Helm Release manifest, thereby defining the final deployment state.

At step 220, Central Helm Charts may be referenced. For example, the Helm Release manifest may refer to a central Helm Chart that is a standardized blueprint for a particular platform. The central Helm Chart is stored and managed by a Central Helm Chart Repository.

At step 222, the config map and a Helm Chart release version may be stored in an external repository, such as a Git Mirror Repository. The relevant directory structures and corresponding kustomization, Helm release and configMap YAMLs (Yet Another Markup Language) required for GitOps methodology to work are pushed to a Highly Available Git Mirror Repository. A Processing Agent running on the target Kubernetes cluster may poll/reconcile against this repository and pull the latest deployment files to be deployed.

Figure 3:
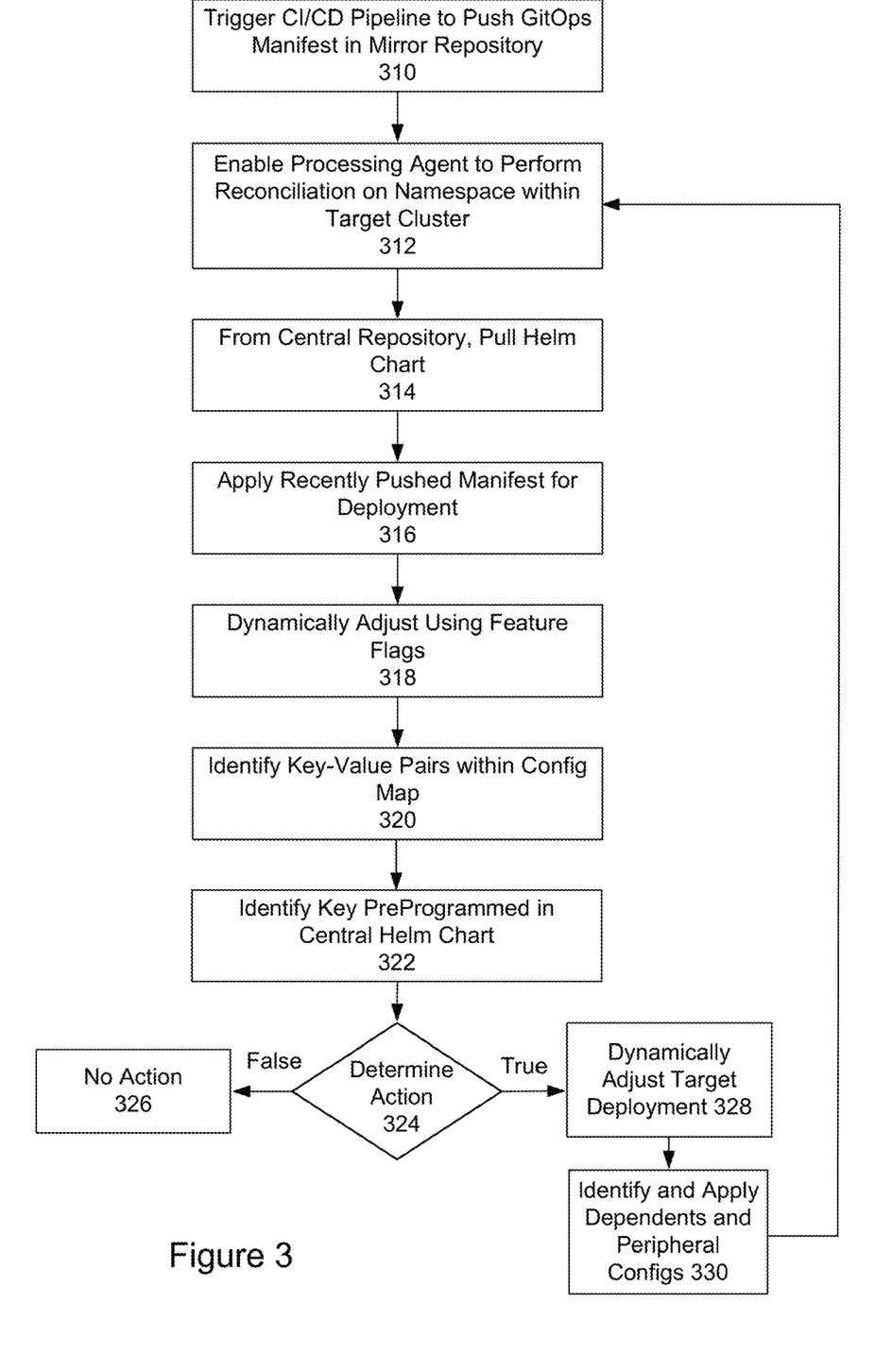
FIG. 3 is an exemplary deployment flowchart, according to an embodiment of the present invention.

FIG. 3 is an exemplary deployment flowchart, according to an embodiment of the present invention. At step 310, a CI/CD pipeline may be triggered. At step 312, a processing agent may perform reconciliation on a namespace within a target cluster. At step 314, a Central Helm Chart may be accessed from a Central Helm Chart Repository. At step 316, a recently pushed manifest may be applied for deployment. At step 318, feature flags may be applied for dynamic adjustment. At step 320, key-value pairs within a config map may be identified. At step 322, a pre-programmed key may be identified in the Central Helm Chart. At step 324, an action on a Feature Flag may be determined. If false, no action is taken at step 326. If true, target deployment may be dynamically adjusted at step 328. At step 330, dependents and peripheral configurations may be identified and applied. The process may repeat at step 312. While the process of FIG. 3 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 310, a CI/CD pipeline may be triggered. After setup and initialization, a CI/CD pipeline may be triggered to push the GitOps manifest in a mirror repository. Helm release manifest may be considered a subset of GitOps manifest files where the GitOps manifest files include all the configuration files that are described within all the directories.

At step 312, a processing agent may perform reconciliation on a namespace within a target cluster. Pushing the GitOps manifest in a mirror repository allows a processing agent to use the GitOps/Helm Release manifest for reconciliation on the corresponding namespace within the target Kubernetes cluster.

At step 314, a Central Helm Chart may be accessed from a Central Helm Chart Repository. This ensures that the central Helm Chart is applied, rather than a custom chart. Applying a central Helm Chart ensures consistency across a platform. The central Helm Chart may be applied for various teams, use cases, applications where dynamic feature flags may be adjusted as needed.

At step 316, a recently pushed manifest may be applied for deployment. The reconciliation process may apply the recently pushed manifests, thereby completing a deployment process. In this implementation, manifests may be pulled from a Git Mirror Repository.

At step 318, feature flags may be applied for dynamic adjustment. For a set of config map values and Helm Release definition, there may be a deployment with side cars and associated objects/attributes.

Figure 6:
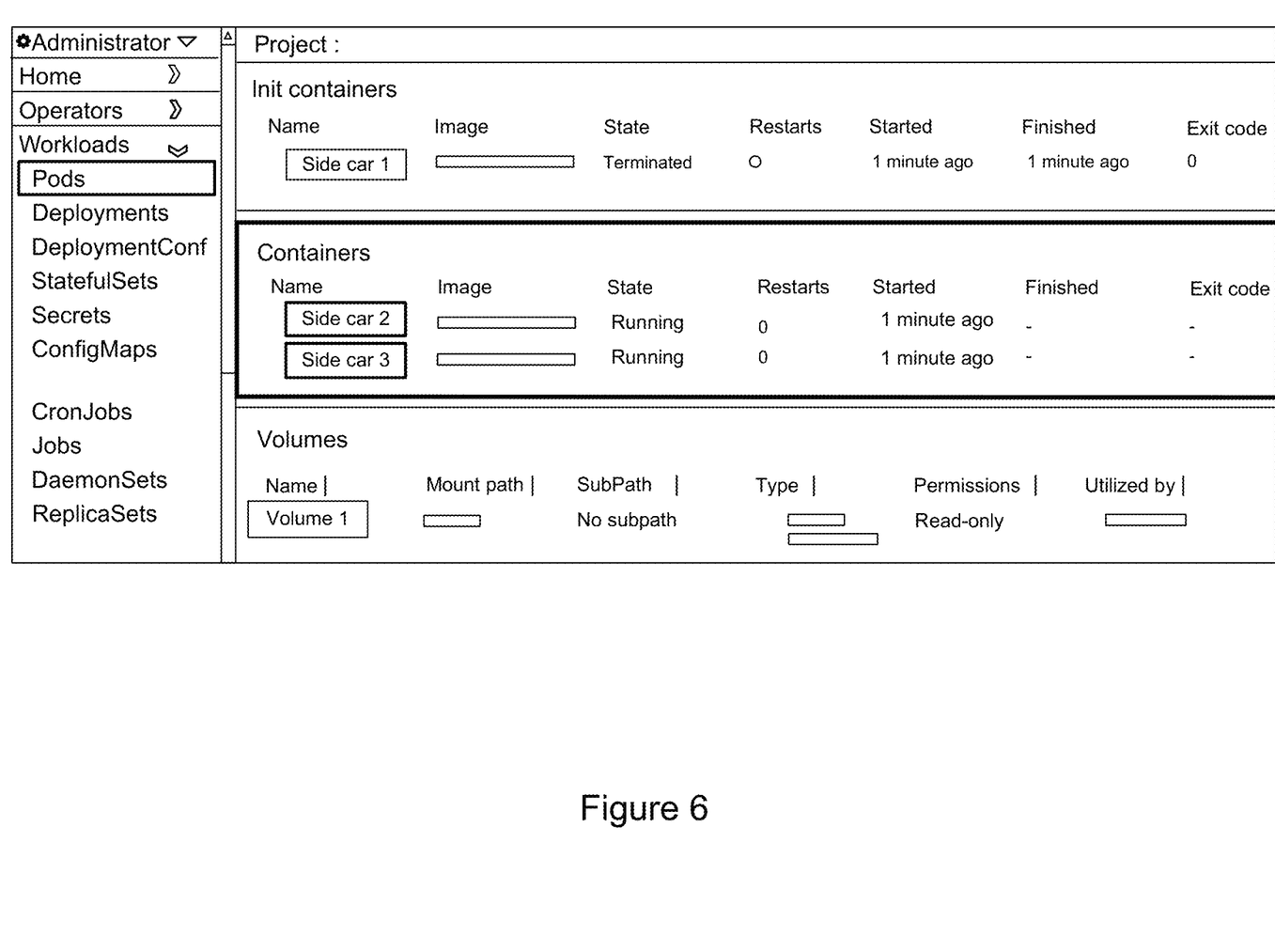
FIG. 6 is an exemplary user interface, according to an embodiment of the present invention.

FIG. 6 is an exemplary user interface, according to an embodiment of the present invention. FIG. 6 is a deployment view that illustrates containers with Side Car 2 and Side Car 3.

At step 320, key-value pairs within a config map may be identified. For example, a key-value pair may be introduced within the config map for dynamically adding a side car for a pod.

Figure 7:
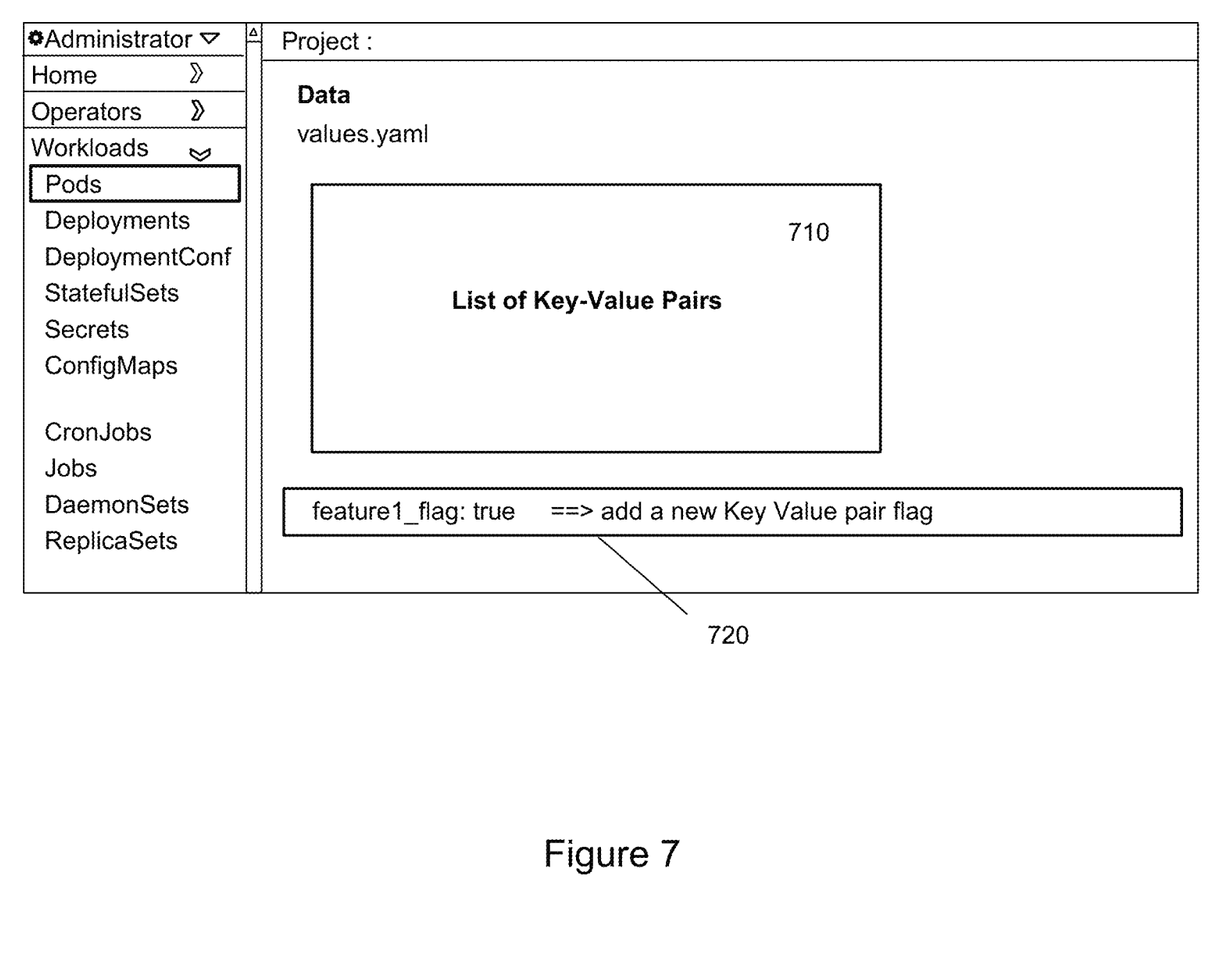
FIG. 7 is an exemplary user interface, according to an embodiment of the present invention.

FIG. 7 is an exemplary user interface, according to an embodiment of the present invention. FIG. 7 illustrates a listing of key-value pairs at 710. As shown by 720, a side car for feature 1 may be added in this pod. Here, "feature1_flag: true" indicates that a new Key Value pair flag has been added. An exemplary feature may include a Fluent Bit that represents a log processor that enriches log files with metadata. Other features may be applied. When a flag is entered and pushed, it may be automatically added and deployed. The developer may define flags through the set of inputs to dynamically change a target deployment. With the dynamic feature flag, the central Helm chart can remain the same with the flag being enabled/disabled by a developer. According to another example, the dynamic flag may be automatically set based on an input or other trigger/condition.

At step 322, a pre-programmed key may be identified in the Central Helm Chart. According to an embodiment, this key may be pre-programmed in the central Helm Chart to read and decide what action to take.

At step 324, an action on a Feature Flag may be determined. If the Feature Flag is set to false, no action is taken at step 326. In this example, if the value is set to be false or if the key is not defined altogether, then the fluent-bit side car is skipped and not added to the final deployment.

If the Feature Flag is set to true, a target deployment may be dynamically adjusted at step 328. In this example, when the value is set to be true, then a fluent-bit side car may be dynamically added to the deployment.

At step 330, dependents and peripheral configurations may be identified and applied. For example, the dynamically added fluent-bit side car may be dependent on peripheral configurations sourced via additional config maps. The peripheral configurations may configure an agent to work as expected. These additional config maps may also be dynamically created and referenced by the central Helm Chart.

Figure 8:
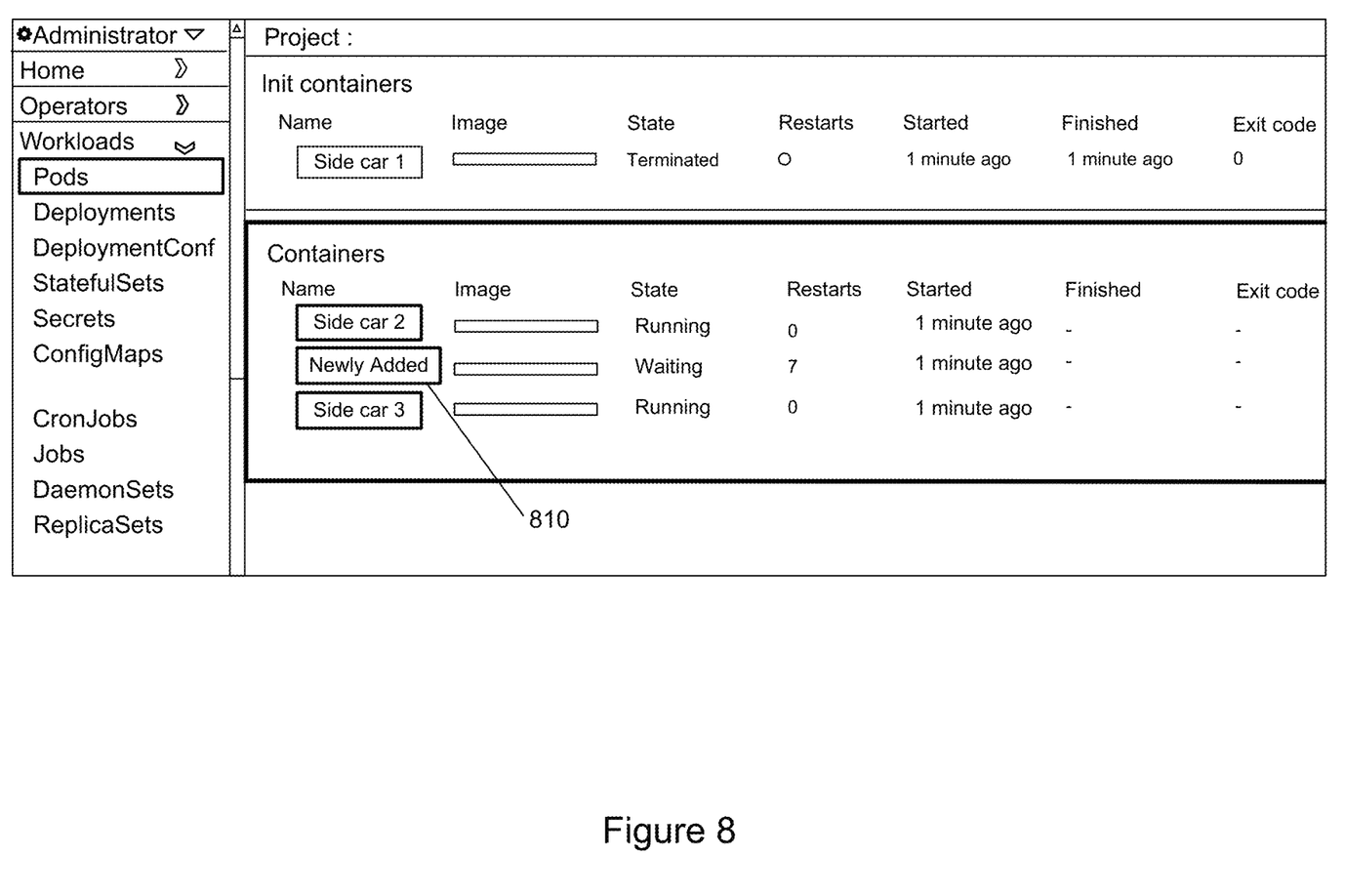
FIG. 8 is an exemplary interface, according to an embodiment of the present invention.

FIG. 8 is an exemplary interface, according to an embodiment of the present invention. FIG. 8 demonstrates that a newly added side car has been successfully added to the deployment, as shown by 810. The process may repeat through a feedback to step 312.

According to an embodiment of the present invention, by adding the feature flag in the config map, the state of the final deployment may be changed easily by adding/removing side cars and other configurations. Notably, a developer does not have to worry about the complex Helm Chart development, side car definitions, config map definitions, technical know-how of the underlying infrastructure of the side car, etc.

This allows users to focus on the business functionality delivery without the hassle of infrastructure and configuration implementation, by using feature flags and dynamic central Helm Charts.

An embodiment of the present invention is directed to managing resources in a Kubernetes cluster. This may involve: storing Helm chart configurations in a centralized repository; defining individual application deployment states using central dynamic Helm charts within a developer's app config code repository; and dynamically adjusting Helm release state based on a central or local configuration via Kubernetes config map deployed via a processing agent (e.g., FluxCD). The Helm chart configuration may include parameters such as feature-flags, CPU limits, memory limits, replicas, and other deployment configurations.

An embodiment of the present invention is directed to implementing central dynamic Helm charts. This may involve: a centralized repository for storing Helm chart configurations; applying intelligent adjustment algorithms for dynamically modifying Helm release configurations; and deployment and management tools for utilizing dynamically adjusted Helm charts to deploy and manage applications. The intelligent adjustment algorithms may include a set of calculations performed based on a custom ruleset to update the Helm charts dynamically based on the key-value pairs and configurations in the centralized repository.

A Configuration Tool may be implemented to define a directory structure with central Helm chart references thereby facilitating deployment, management, and updating of applications.

Those skilled in the art will appreciate that the diagrams discussed above are merely examples of a system and a method for implementing a central dynamic Helm chart repository for standardized Kubernetes resource management and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, IOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system comprising:
a computer server comprising one or more processors;
a central repository storing central dynamic Helm charts; and
non-transitory memory comprising instructions that, when executed by the one or more processors, cause the one or more processors to:
trigger a continuous integration and continuous deployment (CI/CD) pipeline that pushes a manifest to an external repository; wherein the manifest comprises a Helm release manifest sourced from a config map stored in a configuration repository;
perform continuous polling and reconciliation with the external repository through a processing agent executing on a target Kubernetes cluster;
pull, from the central repository, a central Helm chart referenced in the manifest wherein the central Helm chart comprises a configuration that includes a set of parameters that define one or more of: a feature-flag, CPU limit, memory limit, replica, and deployment configuration;
apply the manifest on the target Kubernetes cluster to complete a target flag based deployment;
dynamically adjust the target flag based deployment based on one or more feature flags identified in a configuration file associated with the manifest, wherein the configuration file is automatically created through a configuration tool and the configuration tool automatically generates a folder structure, referencing the central Helm chart, for the configuration file;
dynamically identify features to be enabled based on a respective feature flag for each feature flag of the one or more feature flags;
dynamically apply the features identified by the one or more feature flags in the target flag based deployment, wherein the features identified by the one or more feature flags comprise at least one dependent configuration identified in a peripheral configuration file that becomes part of the target flag based deployment in response to identifying the features.

2. The computer-implemented system of claim 1, wherein the configuration tool comprises a user interface that enables interaction with and input from a developer.

3. The computer-implemented system of claim 2, wherein the developer adjusts the one or more feature flags as true or false through the user interface.

4. The computer-implemented system of claim 1, wherein the external repository comprises a Git Mirror Repository.

5. The computer-implemented system of claim 1, wherein the configuration file is stored in a configuration repository that stores and manages GitOps and application configuration data.

6. The computer-implemented system of claim 1, wherein the one or more feature flags are each associated with a key-value pair.

7. The computer-implemented system of claim 1, wherein the one or more feature flags relate to one or more of: side cars, CPU, memory limits and replicas for deployment.

8. A computer-implemented method, comprising the steps of:
   triggering a continuous integration and continuous deployment (CI/CD) pipeline that pushes a manifest to an external repository; wherein the manifest comprises a Helm release manifest sourced from a config map stored in a configuration repository;
   performing, via a processing agent, continuous polling and reconciliation with the external repository wherein the processing agent executes on a target Kubernetes cluster;
   pulling, from a central repository, a central Helm chart referenced in the manifest wherein the central Helm chart comprises a configuration that includes a set of parameters that define one or more of: a feature-flag, CPU limit, memory limit, replica, and deployment configuration;
   applying the manifest on the target Kubernetes cluster to complete a target flag based deployment;
   dynamically adjusting the target flag based deployment based on one or more feature flags identified in a configuration file associated with the manifest, wherein the configuration file is automatically created through a configuration tool and the configuration tool automatically generates a folder structure, referencing the central Helm chart, for the configuration file;
   dynamically identify features to be enabled based on a respective feature flag for each feature flag of the one or more feature flags;
   and
   dynamically applying the features identified by the one or more feature flags in the target flag based deployment, wherein the features identified by the one or more feature flags comprise at least one dependent configuration identified in a peripheral configuration file that becomes part of the target flag based deployment in response to identifying the features.

9. The computer-implemented method of claim 8, wherein the configuration tool comprises a user interface that enables interaction with and input from a developer.

10. The computer-implemented method of claim 9, wherein the developer adjusts the one or more feature flags as true or false through the user interface.

11. The computer-implemented method of claim 8, wherein the external repository comprises a Git Mirror Repository.

12. The computer-implemented method of claim 8, wherein the configuration file is stored in a configuration repository that stores and manages GitOps and application configuration data.

13. The computer-implemented method of claim 8, wherein the one or more feature flags are each associated with a key-value pair.

14. The computer-implemented method of claim 8, wherein the one or more feature flags relate to one or more of: side cars, CPU, memory limits and replicas for deployment.

* * * * *